(12) United States Patent
Shimoyama et al.

(10) Patent No.: US 8,171,819 B2
(45) Date of Patent: May 8, 2012

(54) TILT STEERING APPARATUS

(75) Inventors: Naoki Shimoyama, Gunma-ken (JP);
Tohru Ohta, Gunma-ken (JP);
Kazunari Machida, Gunma-ken (JP)

(73) Assignee: Yamada Manufacturing Co., Ltd., Kiryu-shi, Gunma-ken (JP)

( * ) Notice: Subject to any disclaimer, the term of this patent is extended or adjusted under 35 U.S.C. 154(b) by 1101 days.

(21) Appl. No.: 12/073,236

(22) Filed: Mar. 3, 2008

(65) Prior Publication Data
US 2008/0282832 A1 Nov. 20, 2008

(30) Foreign Application Priority Data
May 18, 2007 (JP) .................................. 2007-132946

(51) Int. Cl.
*B62D 1/18* (2006.01)
(52) U.S. Cl. ........................................................ 74/493
(58) Field of Classification Search ................ 74/492, 74/493; 280/775, 776
See application file for complete search history.

(56) References Cited

U.S. PATENT DOCUMENTS

| 4,774,851 A * | 10/1988 | Iwanami et al. ................ 74/493 |
| 2006/0022446 A1 * | 2/2006 | Murakami et al. ............. 280/775 |
| 2007/0013182 A1 * | 1/2007 | Bechtel et al. ................. 280/777 |

FOREIGN PATENT DOCUMENTS

| DE | 3626073 A1 | 2/1987 |
| JP | 2005-199733 | 7/2005 |

OTHER PUBLICATIONS

European Search Report dated Sep. 11, 2009.

* cited by examiner

*Primary Examiner* — Vicky Johnson
(74) *Attorney, Agent, or Firm* — McGinn Intellectual Property Law Group, PLLC

(57) ABSTRACT

A tilt steering apparatus comprises a tilt adjusting mechanism in which a tilt lock release is established only when an oscillation-free end of an operating arm portion of a tilt operating lever is positioned toward a steering wheel side. Even when the tilt operating lever is oscillated to the steering wheel side, the tilt operating lever is prevented from returning under its own weight, thereby preventing it from being difficult to operate. The tilt steering apparatus is configured from an oscillation latch portion formed on the circumference of an oscillation center portion of an oscillation base portion of the tilt operating lever to move reciprocally in the circumferential direction, a hook portion formed in the movable bracket, and a spring that extends between the oscillation latch portion and the hook portion elastically urged in the direction of contraction. The centerline of the spring is able to pass through the oscillation center portion of the tilt operating lever as appropriate.

20 Claims, 8 Drawing Sheets

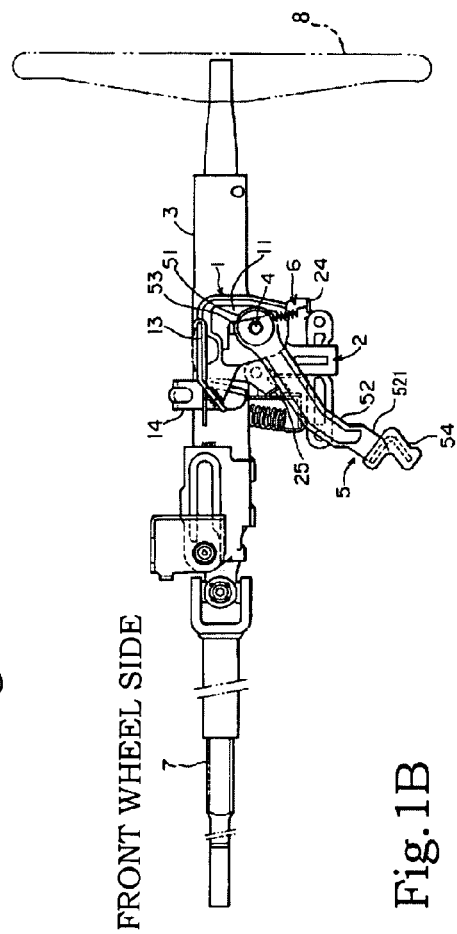
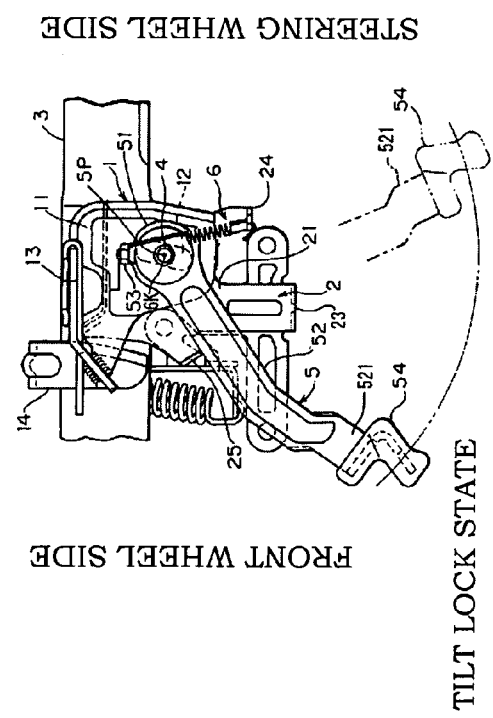
Fig.1A
Fig.1B

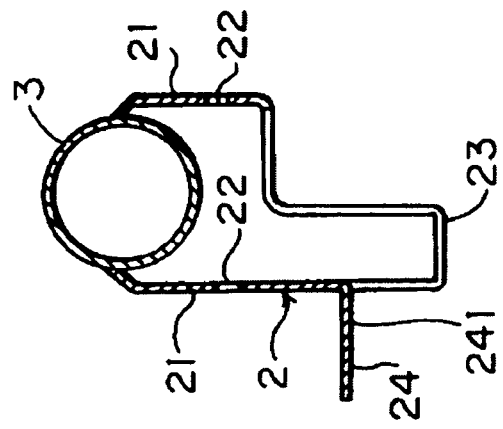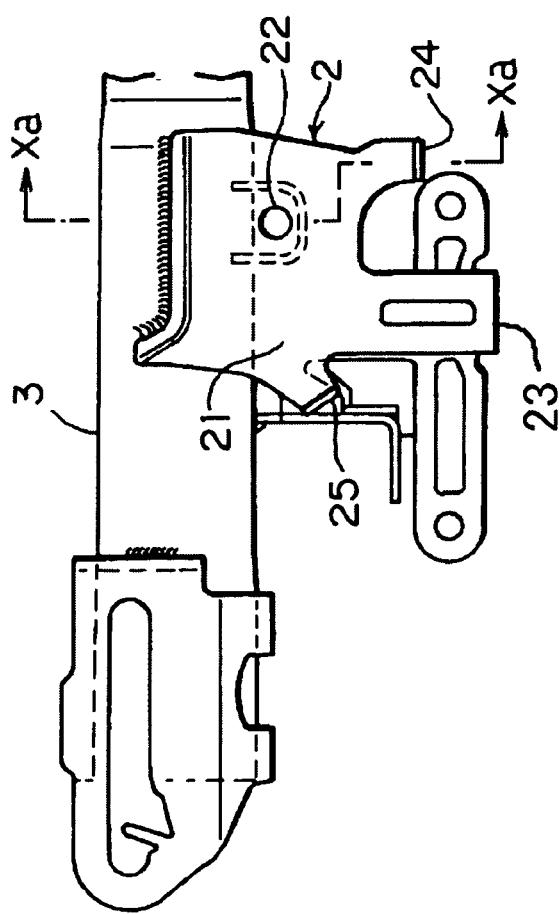

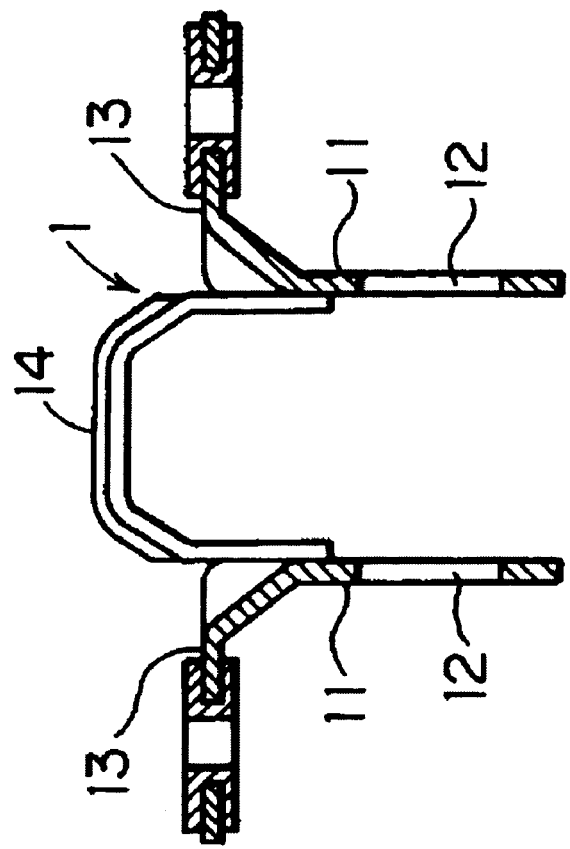
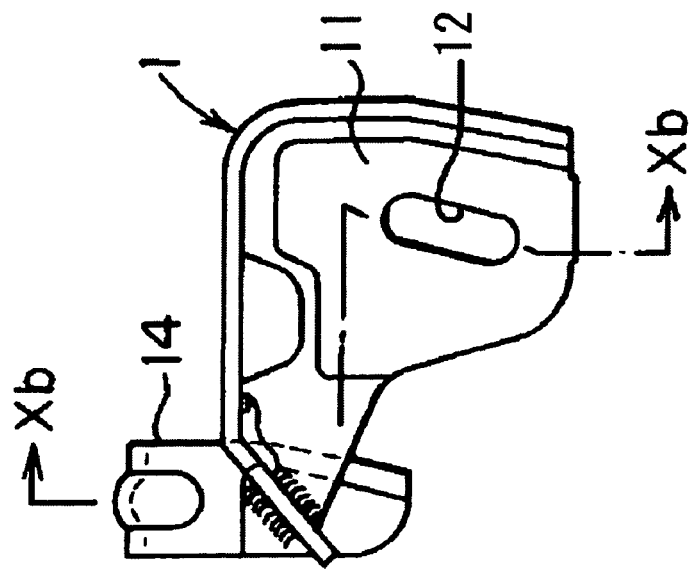

[TILT LOCK RELEASE STATE]

[NEUTRAL STATE]

[TILT LOCK STATE]

ROTATIONAL MOMENT(ANTI-CLOCKWISE DIRECTION) APPLIED TO TILT OPERATING LEVER 5 WHEN TILT LOCK IS RELEASE $La \times F = (-)Ma$

NEUTRAL STATE OF TILT OPERATING LEVER 5
ZERO ROTATIONAL MOMENT

ROTATIONAL MOMENT (CLOCKWISE DIRECTION) APPLIED TO TILT OPERATING LEVER 5 WHEN TILT LOCK LOCKED $Lb \times F = (+)Mb$

TILT STEERING APPARATUS

BACKGROUND OF THE INVENTION

1. Field of the Invention

The present invention relates to a tilt steering apparatus comprising a tilt adjustment mechanism in which tilt lock is established only when an oscillation-free end of an operating arm portion of a tilt operating lever is positioned toward a steering wheel side; even when the tilt operating lever is oscillated to the steering wheel side, the tilt operating lever is prevented from returning under its own weight, thereby preventing it from being difficult to operate.

2. Description of the Related Art

Steering apparatuses commonly comprise a tilt mechanism provided as a means for facilitating movement of a steering wheel to the optimum driving position in terms of comfort for a driver. This mechanism allows the steering wheel to be moved up and down to the optimum position for drivers of a range of body sizes. The tilt steering operation can be performed by oscillating a tilt operating lever that is normally tightened (locked) to a release side (side to which the tilt operating lever is loosened).

The tilt steering operation for adjusting the steering wheel position can only be performed when the tilt operating lever is released, the steering wheel position being reliably fastened as a result of the tilt operating lever being set to a fasten side (being tightened). Tilt mechanisms of improved usability in which the steering wheel adjustment performed subsequent to the tilt operating lever being untightened and positioned to the tilt operating lever release side and the angle of the tilt operating lever being held and then fastened at the release side in order to perform the abovementioned steering wheel tilt adjustment can be performed by a driver using both hands or legs are available. In addition, tilt mechanisms of a type in which, as operating means thereof, the tilt lock is able to be released only when an oscillation-free end of an operating arm portion of the tilt operating lever is positioned toward the steering wheel side have increased in recent years.

However, in tilt mechanisms of a type in which the tilt lock is released only when an oscillation-free end of an operating arm portion of the tilt operating lever is positioned toward the steering wheel side such as described above, the tilt operating lever, under its own weight, oscillates naturally to the fixed (lock) side of the tilt operation and attempts to return to the lock side position.

When this occurs, the driver must hold and support the steering wheel with one hand while holding the abovementioned tilt operating lever with the other—an extremely troublesome tilt operation that places a significant burden on the driver. The invention of Japanese Unexamined Patent Application Publication No. 2005-199733 was proposed with a view to preventing this kind of undesirable state. Japanese Unexamined Patent Application Publication No. 2005-199733 describes a mechanism comprising a spring affixed with displaced phase (angle) to the tilt operating lever in which moment is generated by the spring on the tilt operating lever in the fasten direction at a position on the fasten side of the tilt operating lever, and zero moment is generated on the tilt operating lever by the spring when the tilt operating lever is released.

According to the configuration described above, because tilt operating lever loosening at the tilt operating lever fasten side is prevented by the moment generated in the fasten direction and, in addition, because there is zero moment generated when the tilt operating lever is set to the release side, the tilt operating lever does not rotate in the fasten direction. The cited reference also describes how, because the magnitude of the moment applied to the tilt operating lever by the spring gradually reduces from the fasten side toward the release side as the tilt operating lever is rotated from the fasten side to the release side, the tilt operating lever can be operated using minimal force.

However, the following problems are inherent to the invention of Japanese Unexamined Patent Application Publication No. 2005-199733. First, while zero moment is generated by the spring when the tilt operating lever is set to a position on the release side (lock release side), the angle of the tilt operating lever at lock release cannot be maintained under its own weight and the tilt operating lever rotates slightly in the fasten direction (lock direction) whereupon, as a result, with the angle of the tilt operating lever slightly toward the fasten side, the tilt steering operation is slightly harder.

Furthermore, while there is zero moment finally applied to the tilt operating lever at the release side (lock release side), because the rotational moment generated by the spring is always applied in the fasten direction from the fasten side to the release side, the force for operating the tilt operating lever is increased as a result of a spring being affixed by the amount of this spring moment and, when the tilt operating lever is rotated from the fasten side to the release side, the moment applied by the spring acts constantly in the reverse direction to the direction in which the force of the hands is applied.

SUMMARY OF THE INVENTION

For this reason, the operation for oscillating and moving the tilt operating lever to the release side is subject to the moment resistance generated by the spring and, accordingly, the implementation of this operation requires the driver to apply a significant force. An object of the present invention lies in the provision of a tilt steering apparatus comprising a tilt adjustment mechanism in which tilt lock is established only when an oscillation-free end of an operating arm portion of a tilt operating lever is positioned toward a steering wheel side that ensures prevention of the return of the tilt operating lever during lock release and ease of tilt operation implementation.

The aforementioned problems are resolved by the tilt steering apparatus of the invention of claim 1 which comprises a tilt adjusting mechanism in which a tilt lock release state is established when an oscillation-free end of an operating arm portion of a tilt operating lever screwed to a tilt bolt attached to a movable bracket is positioned toward a steering wheel side, the tilt steering apparatus being configured from an oscillation latch portion formed on a circumference of an oscillation center portion of an oscillation base portion of the abovementioned tilt operating lever to move reciprocally in a circumferential direction, a hook portion formed in the abovementioned movable bracket, and a spring that extends between the abovementioned oscillation latch portion and the abovementioned hook portion and is elastically urged in a direction of contraction, a centerline of the spring being able to pass through an oscillation center portion of the abovementioned tilt operating lever as appropriate.

The aforementioned problems are resolved by the invention of claim 2 in which, in the tilt steering apparatus of the above-described configuration, a state of maximum elongation of the abovementioned spring is established when the centerline thereof is positioned on the oscillation center portion of the abovementioned tilt operating lever. The aforementioned problems are resolved by the invention of claim 3 and 4 in which, in the tilt steering apparatus of the above-described configuration, the abovementioned hook portion forms an oscillation-regulating protrusion against which the abovementioned tilt operating lever abuts. The aforementioned problems are resolved by the invention of claim 5 in which, in the tilt steering apparatus of the above-described configuration, a position-regulating protrusion is formed in the abovementioned movable bracket in the tilt lock state.

The aforementioned problems are resolved by the invention of claim 6 in which, in the tilt steering apparatus of the above-described configuration, the abovementioned spring is a tension coil spring. The aforementioned problems are resolved by the invention of claim 7 in which, in the tilt steering apparatus of the above-described configuration, the abovementioned oscillation latch portion is formed to protrude from the oscillation base portion of the abovementioned tilt operating lever outward in an axial direction from the abovementioned tilt bolt. The aforementioned problems are resolved by the invention of claim 8 in which, in the tilt steering apparatus of the above-described configuration, the abovementioned oscillation latch portion is formed in a position above an oscillation base portion of the abovementioned tilt operating lever, and the abovementioned hook portion is formed in a position below the abovementioned movable bracket.

According to the invention of claim 1, an oscillation latch portion that moves reciprocally in a circumferential direction is formed on the circumference of an oscillation center portion of an oscillation base portion of the abovementioned tilt operating lever, and a hook portion is formed in a movable bracket. A spring is provided to extend between the abovementioned oscillation latch portion and the abovementioned hook portion, the spring being elastically urged in the direction of contraction thereof, and being elastically urged to ensure the abovementioned oscillation latch portion is always in close proximity to the hook portion.

Furthermore, by the oscillation of the tilt operating lever, the centerline of the abovementioned spring is able to pass through the oscillation center portion of the tilt operating lever as appropriate. Accordingly, with the oscillation center portion of the abovementioned tilt operating lever serving as the oscillating (turning) center of the oscillation operation, moment is applied to the abovementioned oscillation latch portion. When the oscillation-free end side of the tilt operating lever is oscillated toward the steering wheel side and the tilt operating lever is positioned at the release side, moment generated by the elastic force of the abovementioned spring is actioned on the tilt operating lever in the direction of lock release and, accordingly, return of the tilt operating lever to the neutral position under its own weight is avoided, and the need for the tilt operating lever to be tightened is eliminated.

As the tilt operation can be performed using both hands using a minimal operating force, the burden on the driver is negligible and, in addition, the implementation of the operation using two hands ensures the fine adjustment of the tilt position of the steering wheel can be performed easily. Furthermore, because the orientation of the moment generated by the contracting elastic force of the spring is equivalent to the direction of operation for lock release of the tilt operating lever subsequent to the tilt operating lever being oscillated slightly from the neutral position to the release side, the tilt operating lever can be operated with minimal operating force (an almost zero force, that is to say, without need for force to be applied). Accordingly, while in the prior art the tilt operating lever tends to be tighter and the tilt operation harder because the rotational torque generated by the spring at the tilt operating lever release side is zero (free state) and slight rotation of the tilt operating lever occurs as a result of it being returned in the fasten direction under its own weight, this drawback can be alleviated in the present invention.

According to the tilt steering apparatus of the invention of claim 2 in which a state of maximum elongation of the abovementioned spring is established when the centerline thereof is positioned on an oscillation center portion of the abovementioned tilt operating lever, the neutral position of the tilt operating lever can be set easily, and the neutral position can be set easily with the naked eye. According to the invention of claims 3 and 4, because the hook portion forms an oscillation-regulating protrusion against which the abovementioned tilt operating lever abuts, combined use of the hook portion as an oscillation-regulating latch portion of the unlock side of the tilt operating lever can be readily configured and, as a result, the need for these two component parts to be separately formed can be eliminated and the structure can be simplified.

According to the invention of claim 5, the tilt operating lever can be regulated across the oscillation region afforded by the formation of the position-regulating protrusion formed in the movable bracket in the tilt lock state, and excessive fastening or excessive unfastening of the tilt operating lever can be prevented. According to the invention of claim 6, the use of a tension coil spring as the spring ensures the ease of attachment thereof between the abovementioned oscillation latch portion and the abovementioned hook portion. In addition, the use of a tension coil spring ensures that the centerline of the spring is easy to set, and that a state in which the centerline of the spring passes through the oscillation centerline portion of the tilt operating lever is easy to set and, accordingly, that the neutral position of the tilt operating lever can be easily set.

According to the invention of claim 7, the formation of the oscillation latch portion to protrude from the oscillation base portion of the abovementioned tilt operating lever outward in an axial direction from the abovementioned tilt bolt ensures that interference between protruding portions such as the tilt bolt of the abovementioned oscillation center portion in a state in which the spring is attached between the abovementioned oscillation latch portion and the hook portion can be easily prevented and, because of the absence of any mutual interference, that a reliable apparatus can be produced. According to the invention of claim 8, the formation of the oscillation latch portion in a position above the oscillation base portion of the abovementioned tilt operating lever and the formation of the abovementioned hook portion is formed in a position below the abovementioned movable bracket ensures ease of attachment of the spring and very good assemblability thereof.

BRIEF DESCRIPTION OF THE DRAWINGS

FIG. 1A is a side view of a steering apparatus comprising the present invention,
and
FIG. 1B is a main part enlarged view of FIG. 1A;
FIG. 3A is a side view of a movable bracket,
and
FIG. 3B is a cross-sectional view along the line of the arrows Xa-Xa of FIG. 3A;
FIG. 4A is a side view of a fixed bracket,
and
FIG. 4B is a cross-sectional view along the line of the arrows Xb-Xb of FIG. 4A.

DESCRIPTION OF THE PREFERRED EMBODIMENTS

Figure 2:
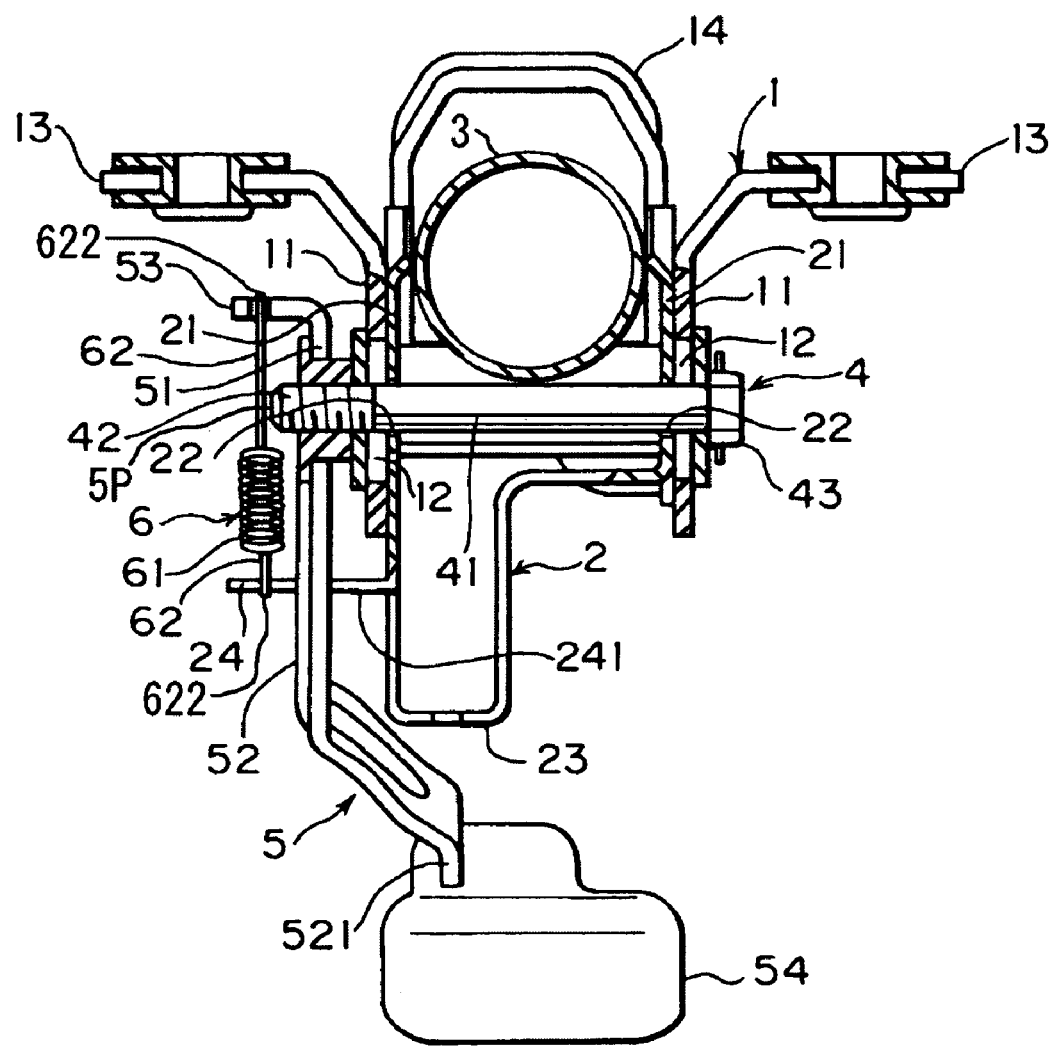
FIG. 2 is a main part enlarged front view of a steering apparatus comprising the present invention.

An embodiment of the present invention will be hereinafter described with reference to the drawings. As shown in FIGS. 1 and 2, the present invention is principally configured from a fixed bracket 1, a movable bracket 2, a column tube 3, a tilt bolt 4, a tilt operating lever 5, and a spring 6 and so on. As shown in FIG. 4, the fixed bracket 1 is principally configured from fixed side portions 11, 11 and mounting portions 13, 13. The two fixed side portions 11, 11 are essentially flat plate-shaped parallely opposed parts. Tilt-adjustment long holes 12, 12 serving as parts through which a later-described tilt bolt 4 passes are formed in essentially the vertical direction of the two fixed side portions 11, 11.

The abovementioned two fixed side portions 11, 11 are coupled at an upper part thereof by way of a coupling portion 14 by soldering means or the like. From the front view, the coupling portion 14 is formed in an arch shape essentially trapezoidal in shape. In addition, the horizontally-provided mounting portions 13, 13 are formed outward from an upper-end part of the two fixed side portions 11, 11. These fixed bracket 1 is affixed by way of the abovementioned mounting portions 13, 13 to a frame member or the like of a front portion of a vehicle such as an automobile.

As shown in FIG. 3, the abovementioned movable bracket 2 is principally formed from movable side portions 21, 21 and a base portion 23. The two movable side portions 21, 21 are disposed in parallel and the two movable side portions 21, 21 are disposed between the two fixed side portions 11, 11 of the abovementioned fixed bracket 1 and, for this reason, the interval between the two movable side portions 21, 21 is set slightly smaller than that between the abovementioned fixed side portions 11, 11. Tilt-adjustment through holes 22, 22 that serve as a structure though which the later-described tilt bolt 4 passes into the fixed side portions 11, 11 of the abovementioned fixed bracket 1 and the two movable side portions 21, 21 of the movable bracket 2 are formed in the two movable side portions 21, 21. The column tube 3 is fixed to an upper-end part of the two movable side portions 21, 21 of the movable bracket 2. The column tube 3 is fixed to the abovementioned two movable side portions 21, 21 by soldering means or the like. A steering shaft 7 is turnably attached to the column tube 3, and a steering wheel 8 is attached to a tip end of the steering shaft 7.

As shown in FIG. 2, the tilt bolt 4 is configured from a bolt axis portion 41, bolt threaded portion 42 and a bolt head portion 43, the bolt threaded portion 42 being formed in one end in the axial direction of the abovementioned bolt axis portion 41, and the bolt head portion 43 being formed in the other end in the axial direction thereof. In addition, the tilt operating lever 5 is attached to the abovementioned tilt bolt 4 in a direction in which the thread of the abovementioned bolt threaded portion 42 is formed, the direction in which the thread of the abovementioned bolt threaded portion 42 is formed being determined in such a way that tilt lock release occurs as a result of an oscillating operation in which the abovementioned tilt operating lever 5 oscillates from the front wheel side (see FIG. 1) to the steering wheel 8 side being performed.

As shown in FIG. 2, the two movable side portions 21, 21 of the movable bracket 2 are disposed between the fixed side portions 11, 11 of the abovementioned fixed bracket 1, and the abovementioned tilt bolt 4 passes through the tilt-adjustment long holes 12, 12 of the fixed side portions 11, 11 and the two tilt-adjustment through holes 22, 22 of the movable bracket 2. The through holes 22 through which the abovementioned tilt bolt 4 passes are not long holes but rather substantially circular-shaped through holes.

The abovementioned tilt bolt 4 is movable in the vertical direction with respect to the tilt-adjustment long holes 12, 12 and, accordingly, the abovementioned movable bracket 2 is vertically movable together with the abovementioned tilt bolt 4 with respect to the abovementioned fixed bracket 1. In addition, while the tilt bolt 4 is attached to the fixed bracket 1 and the movable bracket 2 in an unturnable (or idle) state, as the unturnable structure thereof, the abovementioned bolt head portion 43 is fixed to the fixed bracket 1 or the movable bracket 2 by a pressing jig or the like. In addition, while not shown in the diagrams, a structure in which a protrusion portion insertable and slidable within the abovementioned tilt-adjustment long hole 12 is formed on the side of the bolt head portion 43 in which the bolt threaded portion 42 is formed and in which the tilt bolt 4 becomes unturnable (idle) as a result of this protrusion portion being inserted in the abovementioned tilt-adjustment long hole 12 may be adopted.

Figure 5A:
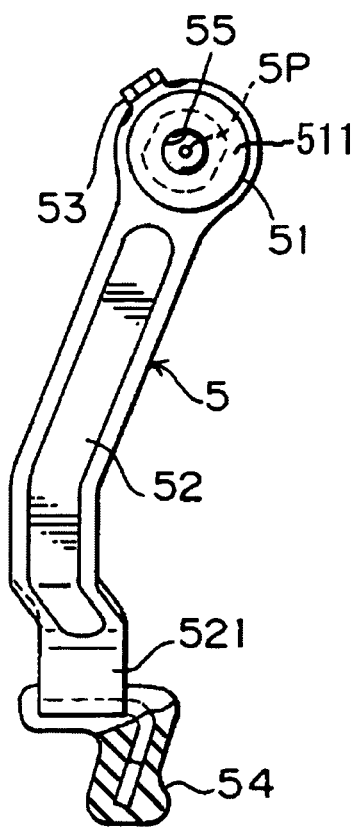
FIG. 5A is a side view of a tilt operating lever.
Figure 5B:
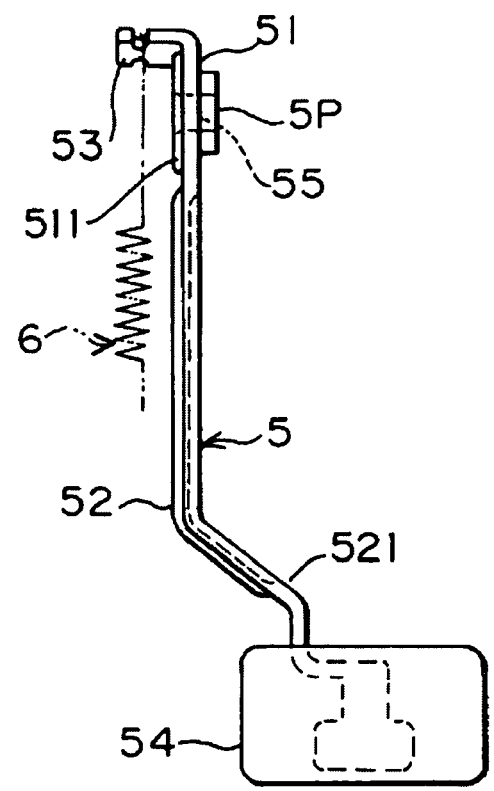
FIG. 5B is a front view of the tilt operating lever.

As shown in FIG. 5, the tilt operating lever 5 is principally configured from an oscillation base portion 51 and an operating arm portion 52. The oscillation base portion 51 serves as the turning center about which the tilt operating lever 5 oscillates, an inner threaded portion 55 being formed in the center part thereof. In addition, as shown in FIG. 2, the inner threaded portion 55 is screwed to the bolt threaded portion 42 of the abovementioned tilt bolt 4 at the outer side of the fixed side portions 11, 11 of the abovementioned fixed bracket 1. A reinforcing disk 511 formed in a substantially concentric circle about the inner threaded portion 55 of the abovementioned oscillation base portion 51 is also affixed thereto. The tilt operating lever 5 is integrally formed with the abovementioned oscillation base portion 51 and the operating arm portion 52, or is formed as a separate member thereto, or is couplingly formed in such a way as to be integrated therewith by fixing means such as soldering. The abovementioned oscillation base portion 51 is located in one end side in the longitudinal direction of the abovementioned operating arm portion 52, and the other end is formed as an oscillation-free end 521. An operating grip 54 is attached the oscillation-free end 521 side.

Figure 6A:
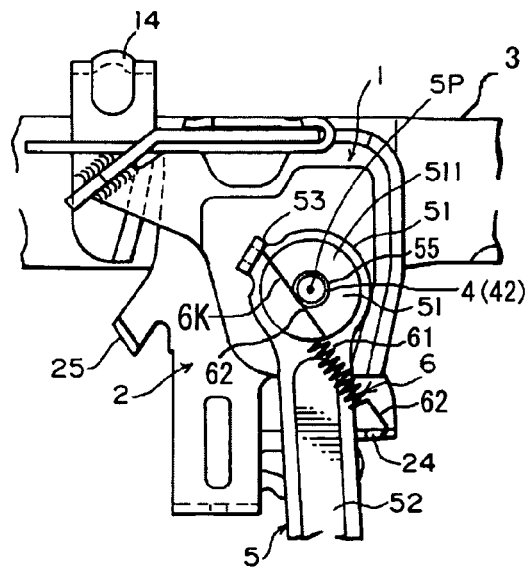
FIG. 6A is a main part side view of a steering apparatus spring latch structure.
Figure 6B:
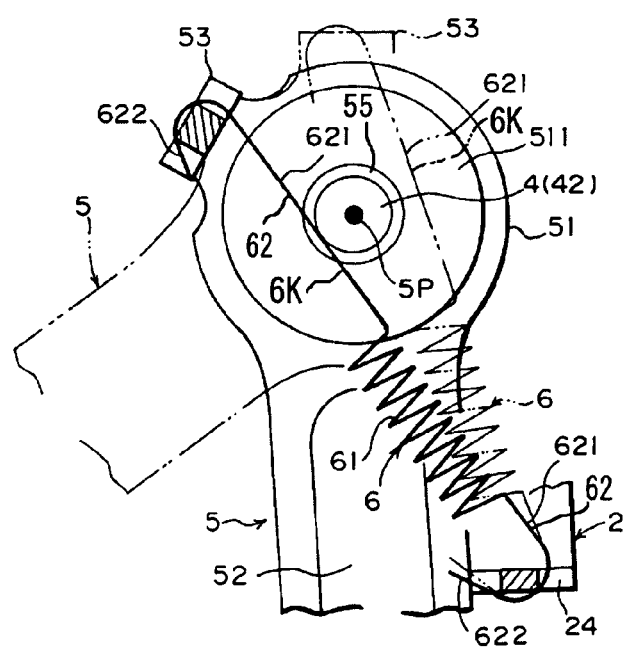
FIG. 6B is a main part enlarged view of FIG. 6A.
Figure 7A:
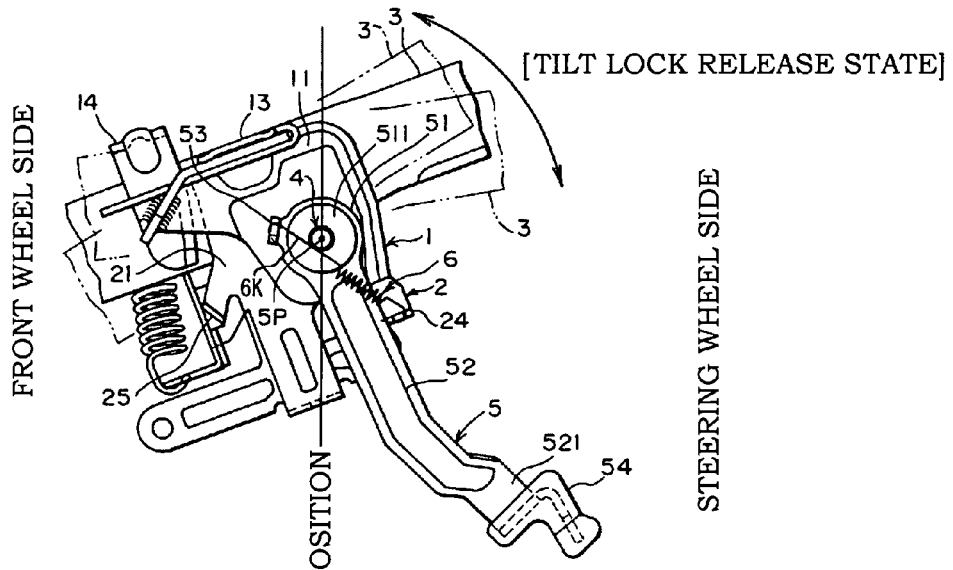
FIG. 7A is a main part enlarged view of a tilt operating lever positioned in tilt lock release state.

As shown in FIG. 2, the tilt operating lever 5 is attached so that, as viewed from the driver side, the tilt operating lever 5 lies in a position to the left side of the abovementioned fixed bracket 1. Furthermore, as shown in FIG. 7A, tilt lock release state is established when the tilt operating lever 5 is oscillatingly operated toward the steering wheel 8, the tightened state thereof being untightened at the part where the abovementioned tilt bolt 4 and tilt operating lever 5 are screwed together. As shown in FIG. 1, FIG. 5 and FIG. 6 and so on, an oscillation latch portion 53 is formed in the oscillation base portion 51 of the abovementioned tilt operating lever 5. The oscillation latch portion 53 is formed in a position above the oscillation base portion 51 of the tilt operating lever 5. The role of the abovementioned oscillation latch portion 53 is to latch a later-described spring 6 to the tilt operating lever 5 side.

Figure 7B:
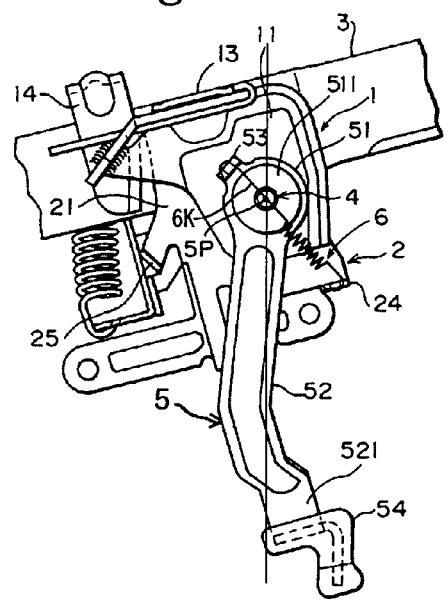
FIG. 7B is a main part enlarged view showing the tilt operating lever in a neutral state.
Figure 7C:
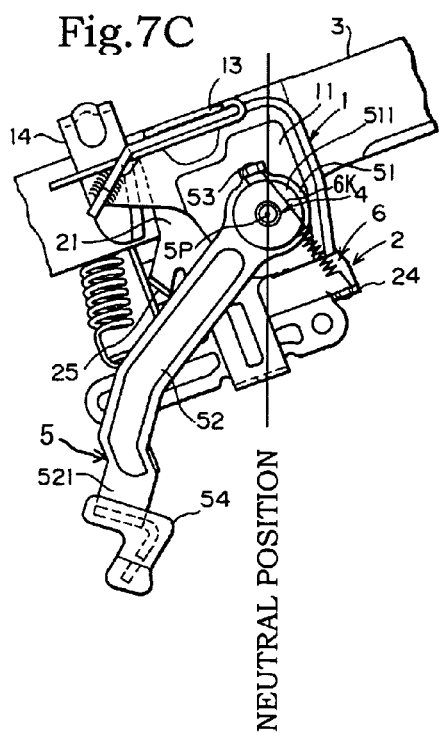
FIG. 7C is a main part enlarged view showing the tilt operating lever positioned in the tilt lock state.

The abovementioned oscillation base portion 53 is formed in such a way as to be positioned on the substantially upper side of the oscillation base portion 51 when the tilt operating lever 5 is attached to the tilt bolt 4 in an suitable state of attachment to the abovementioned fixed bracket 1 and movable bracket 2 (see FIG. 1 and FIG. 7). Furthermore, the abovementioned oscillation latch portion 53 is formed to protrude from the oscillation base portion 51 of the abovementioned tilt operating lever 5 outward in the axial direction of the abovementioned tilt bolt 4. That is to say, the abovementioned oscillation latch portion 53 is formed to protrude outward of the fixed bracket 1 in a state in which the tilt operating lever 5 is suitably attached by way of the tilt bolt 4 to the fixed bracket 1.

The section above the abovementioned positioned on the upper side denotes a section located above an oscillation center portion 5P of the oscillation base portion 51 of the abovementioned tilt operating lever 5. In addition, the abovementioned oscillation center portion 5P refers to the position that serves as the center about which the oscillating operation of the operating arm portion 52 of the tilt operating lever 5 is performed and, more specifically, refers to the center in the diametric direction of the inner threaded portion 55 formed in the oscillation base portion 51, or to a center position in the axial diameter of the tilt bolt 4 screwed into the inner threaded portion 55.

A hook portion 24 is formed in the abovementioned movable bracket 2 side. In addition, a spring 6 provided to extend between the oscillation latch portion 53 that moves reciprocally in the circumferential direction formed on the circumference of the oscillation center portion 5P of the abovementioned oscillation base portion 51 and the hook portion 24 formed in the abovementioned movable bracket 2 is elastically urged in the direction of contraction. A centerline 6K of the spring 6 is able to pass through the oscillation center portion 5P of the abovementioned tilt operating lever 5 as appropriate. The abovementioned centerline 6K is used to virtually show the elastic force of the spring 6 generated along the extension direction thereof as a straight line, and shows the direction in which the elastic force thereof is applied as a straight line.

As the abovementioned spring 6, a tension coil spring is used. More specifically, a hook shaft 62 is formed in both sides in the longitudinal direction of a coil portion 61. The hook shafts 62 comprise a hook portion 622 formed in a tip-end section of a straight section 621, the hook portion 622 catching against the oscillation latch portion 53 and the hook portion 24. In addition, a state of maximum elongation of the coil portion 61 of the abovementioned spring 6 is established when the abovementioned centerline 6K is positioned on the oscillation center portion 5P of the abovementioned tilt operating lever 5. More specifically, a state of maximum elongation of the coil portion 61 is established when the centerline 6K of the abovementioned spring 6 passes through three points on each of the abovementioned oscillation latch portion 53, the oscillation center portion 5P and the hook portion 24 (see FIG. 8B).

In addition, the abovementioned hook portion 24 comprises an oscillation-regulating portion 241 against which the abovementioned tilt operating lever 5 abuts. The oscillation-regulating portion 241 constitutes a part against which the operating arm portion 52 of the abovementioned tilt operating lever 5 abuts at the lock release side and, accordingly, the abovementioned operating arm portion 52 is prevented from nearing the steering wheel 8 side. That is to say, difficulty in implementing the steering wheel 8 tilt operation caused by the operating arm portion 52 being too near the steering wheel 8 is prevented.

Furthermore, a tilt lock state position-regulating protrusion 25 is formed in the abovementioned movable bracket 2. Even if the operating arm portion 52 is forcibly oscillated and moved excessively toward the front wheel side when a switch from the tilt lock release state to the tilt lock state is performed, damage to the tilt bolt 4 and the fixed bracket 1 or the movable bracket 2 and so on caused by excessive tightening between the inner threaded portion 55 of the tilt operating lever 5 and the bolt threaded portion 42 of the tilt bolt 4 can be prevented by this position-regulating protrusion 25.

The tilt operation of the present invention will be hereinafter described. In the present invention, as is described above, the abovementioned spring 6 is attached with a phase (angle) difference between the tilt lock state and the respective tilt lock release states. A rotational moment produced by a force of the spring 6 as it attempts to return to its free length (restoring force) acts on the abovementioned tilt operating lever 5 in the clockwise or anti-clockwise direction. The tilt lock state or tilt lock release state of the abovementioned tilt operating lever 5 can be maintained, and the tilt operating lever 5 prevented from returning to the neutral position under its own weight by this rotational moment.

Figure 8A:
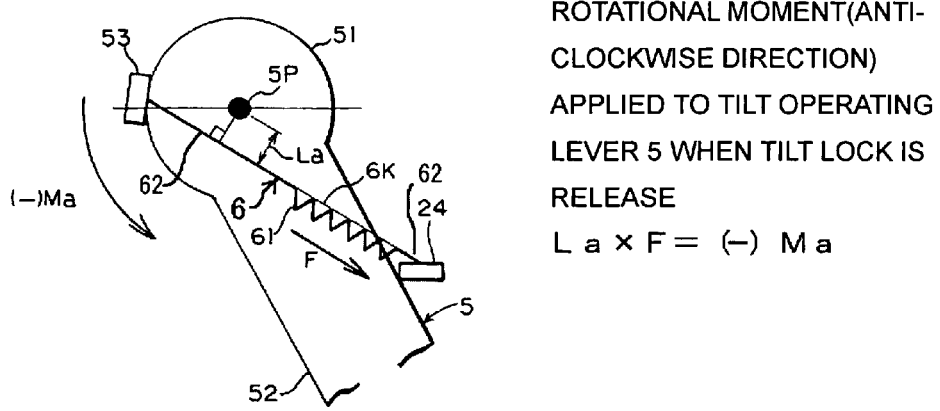
FIG. 8A is a simplified view of the rotational moment in the tilt lock release state.
Figure 8B:
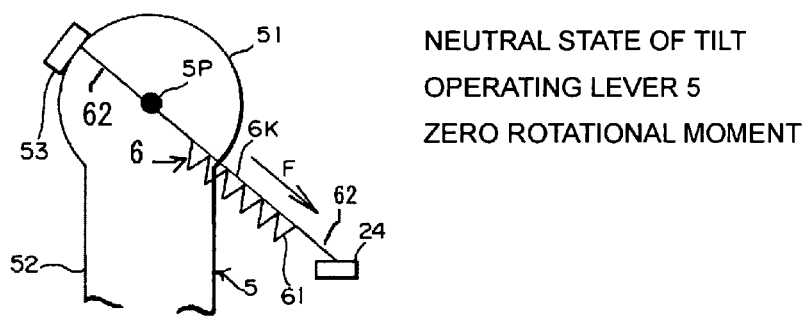
FIG. 8B is a simplified view of the neutral state of the spring.

First, in the tilt lock release state, the centerline 6K of the abovementioned spring 6 is positioned toward the front wheel side from the oscillation center portion 5P of the abovementioned tilt operating lever 5 (see FIG. 8A). In this state, the abovementioned spring 6 applies tension in the direction of elastic contraction of the coil portion 61, and applies rotational moment in a direction opposing the direction in which the inner threaded portion 55 of the abovementioned tilt operating lever 5 is tightened to the bolt threaded portion 42 of the tilt bolt 4.

As a result, moment is generated in a direction in which the abovementioned tilt operating lever 5 is untightened from the tilt bolt 4 (sic??). That is to say, taking the interval of shortest distance from the abovementioned oscillation center portion 5P of the centerline 6K of the abovementioned spring 6 as La and the elastic force of the spring 6 as F, the relationship $(-)Ma = La \times F$ which describes an anti-clockwise direction rotational moment Ma applied to the tilt operating lever 5 in the tilt lock state is established (see FIG. 8A).

Figure 8C:
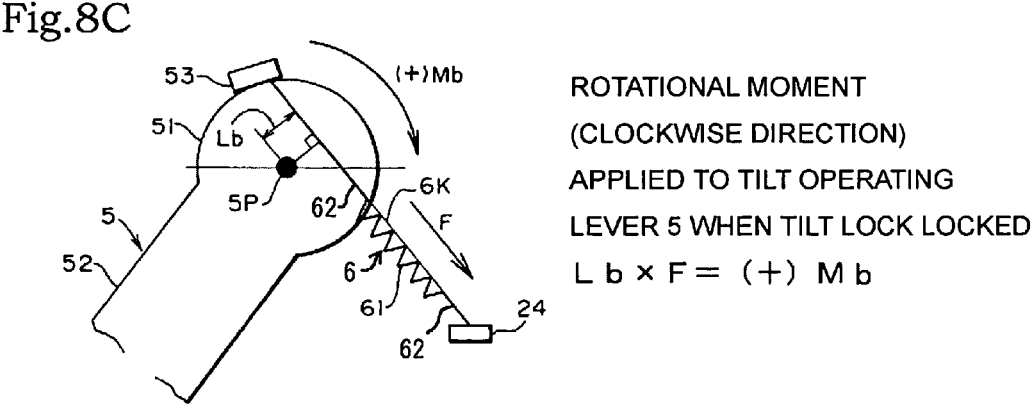
FIG. 8C is a simplified view of the rotational moment in the tilt lock state.

Next, in the tilt lock state, the centerline 6K of the abovementioned spring 6 is positioned toward the steering wheel 8 side from the oscillation center portion 5P of the abovementioned tilt operating lever 5 (see FIG. 8C). In this state, the abovementioned spring 6 applies tension in the direction of elastic contraction of the coil portion 61, and applies rotational moment in the same direction that the inner threaded portion 55 of the abovementioned tilt operating lever 5 is tightened to the bolt threaded portion 42 of the tilt bolt 4.

As a result, moment is generated in the direction in which the abovementioned tilt operating lever 5 is untightened from the tilt bolt 4. That is to say, taking the interval of shortest distance from the abovementioned oscillation center portion 5P of the centerline 6K of the abovementioned spring 6 as Lb, and the elastic force of the spring 6 as F, the relationship $(+)Mb = Lb \times F$ which describes a rotational moment Mb applied to the tilt operating lever 5 in the tilt lock state is established (see FIG. 8C).

The neutral position of the tilt operating lever 5 is established when the centerline 6K of the abovementioned spring 6 is positioned on the oscillation center portion 5P of the abovementioned tilt operating lever 5. While in this state the coil portion 61 of the spring 6 tries to contract (tries to return to its natural length), the centerline 6K lies on the three points of the oscillation latch portion 53, the oscillation center portion 5P and the hook portion 24, and there is no rotational moment generated on the tilt operating lever 5 in either direction, that is to say, in either the clockwise or anticlockwise direction thereof, and the rotational moment is 0 (zero) (see FIG. 8B).

In addition, taking the neutral position as a reference, when the oscillation-free end 521 side of the operating arm portion 52 of the abovementioned tilt operating lever 5 is moved toward the steering wheel 8 side, the action of the elastic force of the abovementioned spring 6 maintains a state of close proximity of the abovementioned operating arm portion 52 to the steering wheel 8, prevents return of the tilt operating lever 5 (in particular, the operating arm portion 52) under its own weight to the neutral position side, and ensures the tilt operation can be performed in a stable state.

What is claimed is:

1. A tilt steering apparatus, comprising:
    a tilt adjusting mechanism in which a tilt lock release state is established when an oscillation-free end of an operating arm portion of a tilt operating lever screwed to a tilt bolt attached to a movable bracket is positioned toward a steering wheel side;
    an oscillation latch portion formed on a circumference of an oscillation center portion of an oscillation base portion of said tilt operating lever to move reciprocally in a circumferential direction;
    a hook portion formed in said movable bracket; and
    a spring that extends between said oscillation latch portion and said hook portion, and is elastically urged in a direction of contraction, a centerline of the spring being able to pass through an oscillation center portion of said tilt operating lever,
    wherein, in a tilt lock state, said spring causes a torque to be generated at said tilt operating lever in a tightening direction around the tilt bolt, and
    wherein, in a state where the tilt lock is released, said spring causes a torque to be generated at said tilt operating lever in a loosening direction around the tilt bolt.

2. The tilt steering apparatus as claimed in claim 1, wherein a state of maximum elongation of said spring is established when the centerline thereof is positioned on the oscillation center portion of said tilt operating lever.

3. The tilt steering apparatus as claimed in claim 2, wherein said hook portion forms an oscillation-regulating protrusion against which said tilt operating lever abuts.

4. The tilt steering apparatus as claimed in claim 3, wherein a position-regulating protrusion is formed in said movable bracket in a tilt lock state.

5. The tilt steering apparatus as claimed in claim 3, wherein said spring comprises a tension coil spring.

6. The tilt steering apparatus as claimed in claim 3, wherein said oscillation latch portion is formed to protrude from the oscillation base portion of said tilt operating lever in an outward axial direction of said tilt bolt.

7. The tilt steering apparatus as claimed in claim 3, wherein said oscillation latch portion is formed in a position above the oscillation base portion of said tilt operating lever, and said hook portion is formed in a position below said movable bracket.

8. The tilt steering apparatus as claimed in claim 2, wherein a position-regulating protrusion is formed in said movable bracket in a tilt lock state.

9. The tilt steering apparatus as claimed in claim 2, wherein said spring comprises a tension coil spring.

10. The tilt steering apparatus as claimed in claim 2, wherein said oscillation latch portion is formed to protrude from the oscillation base portion of said tilt operating lever in an outward axial direction of said tilt bolt.

11. The tilt steering apparatus as claimed in claim 2, wherein said oscillation latch portion is formed in a position above the oscillation base portion of said tilt operating lever, and said hook portion is formed in a position below said movable bracket.

12. The tilt steering apparatus as claimed in claim 1, wherein said hook portion forms an oscillation-regulating protrusion against which said tilt operating lever abuts.

13. The tilt steering apparatus as claimed in claim 12, wherein a position-regulating protrusion is formed in said movable bracket in a tilt lock state.

14. The tilt steering apparatus as claimed in claim 12, wherein said spring comprises a tension coil spring.

15. The tilt steering apparatus as claimed in claim 12, wherein said oscillation latch portion is formed to protrude from the oscillation base portion of said tilt operating lever in an outward axial direction of said tilt bolt.

16. The tilt steering apparatus as claimed in claim 12, wherein said oscillation latch portion is formed in a position above the oscillation base portion of said tilt operating lever, and said hook portion is formed in a position below said movable bracket.

17. The tilt steering apparatus as claimed in claim 1, wherein a position-regulating protrusion is formed in said movable bracket in a tilt lock state.

18. The tilt steering apparatus as claimed in claim 1, wherein said spring comprises a tension coil spring.

19. The tilt steering apparatus as claimed in claim 1, wherein said oscillation latch portion is formed to protrude from the oscillation base portion of said tilt operating lever in an outward axial direction of said tilt bolt.

20. The tilt steering apparatus as claimed in claim 1, wherein said oscillation latch portion is formed in a position above the oscillation base portion of said tilt operating lever, and said hook portion is formed in a position below said movable bracket.

* * * * *